(12) United States Patent
Kim et al.

(10) Patent No.: US 11,578,179 B2
(45) Date of Patent: Feb. 14, 2023

(54) ANTIMICROBIAL POLYMER COATING COMPOSITION AND ANTIMICROBIAL POLYMER FILM

(71) Applicant: LG CHEM, LTD., Seoul (KR)

(72) Inventors: Mingoo Kim, Daejeon (KR); Hyeok Jeong, Daejeon (KR); Jinkyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 901 days.

(21) Appl. No.: 16/474,835

(22) PCT Filed: Oct. 23, 2018

(86) PCT No.: PCT/KR2018/012574
§ 371 (c)(1),
(2) Date: Jun. 28, 2019

(87) PCT Pub. No.: WO2019/083259
PCT Pub. Date: May 2, 2019

(65) Prior Publication Data
US 2021/0130625 A1     May 6, 2021

(30) Foreign Application Priority Data

Oct. 23, 2017  (KR) .................. 10-2017-0137658

(51) Int. Cl.
  *C08J 7/056*   (2020.01)
  *C09D 7/63*   (2018.01)
  (Continued)

(52) U.S. Cl.
  CPC .............. *C08J 7/056* (2020.01); *C09D 5/14* (2013.01); *C09D 7/63* (2018.01); *C09D 133/08* (2013.01); *C09D 133/10* (2013.01); *C09D 135/02* (2013.01)

(58) Field of Classification Search
CPC combination set(s) only.
See application file for complete search history.

(56) References Cited

U.S. PATENT DOCUMENTS 4,892,402 A    1/1990  Sawamoto et al.
6,030,606 A *  2/2000  Holmes .................. A61K 6/893
                                                  424/49
(Continued)

FOREIGN PATENT DOCUMENTS

CN          1629226 A      6/2005
CN        102802676 A     11/2012
(Continued)

OTHER PUBLICATIONS

Copolymers of N-vinyl Pyrrolidone, Kao et al., Journal of Biomedical Materials Research, Jul. 31, 2002, vol. 38, Issue 3 (Year: 2002).*
(Continued)

*Primary Examiner* — Peter A Salamon
(74) *Attorney, Agent, or Firm* — Rothwell, Figg, Ernst & Manbeck, P.C.

(57) ABSTRACT

The present invention relates to an antimicrobial polymer coating composition including: a (meth)acrylate-based monomer or oligomer containing an alkylene oxide having 1 to 10 carbon atoms; a photosensitizer; and a photoinitiator, and an antimicrobial polymer film including a substrate layer including a polymer resin containing a (meth)acrylate-based repeating unit having an introduced alkylene oxide functional group having 1 to 10 carbon atoms, and a photosensitizer dispersed in the substrate layer, wherein the antimicrobial polymer film has surface energy of 32 mN/m or more.

14 Claims, 6 Drawing Sheets

(51) Int. Cl.
*C09D 5/14* (2006.01)
*C09D 133/08* (2006.01)
*C09D 133/10* (2006.01)
*C09D 135/02* (2006.01)

(56) References Cited

U.S. PATENT DOCUMENTS

| | | | |
|---|---|---|---|
| 7,879,950 B2 | 2/2011 | Asami et al. | |
| 8,163,077 B2* | 4/2012 | Eron | B41M 7/0081 |
| | | | 106/31.86 |
| 8,507,603 B2 | 8/2013 | Asami et al. | |
| 8,900,696 B2 | 12/2014 | Kliesch et al. | |
| 2003/0194433 A1 | 10/2003 | Hei et al. | |
| 2005/0287112 A1 | 12/2005 | Kwon et al. | |
| 2006/0204452 A1 | 9/2006 | Velamakanni et al. | |
| 2007/0166344 A1 | 7/2007 | Qu et al. | |
| 2008/0004686 A1* | 1/2008 | Hunt | A61L 31/14 |
| | | | 606/14 |
| 2008/0026026 A1 | 1/2008 | Lu | |
| 2009/0214840 A1* | 8/2009 | Eron | B41M 5/007 |
| | | | 428/210 |
| 2012/0100039 A1 | 4/2012 | Appeaning et al. | |
| 2014/0314826 A1* | 10/2014 | Williams | A61L 27/34 |
| | | | 526/284 |
| 2016/0205925 A1 | 7/2016 | Nisnevitch et al. | |
| 2016/0333131 A1 | 11/2016 | Kawai et al. | |
| 2021/0130625 A1* | 5/2021 | Kim | C09D 7/63 |
| 2022/0202669 A1* | 6/2022 | Saini | A61K 8/55 |

FOREIGN PATENT DOCUMENTS

| | | |
|---|---|---|
| CN | 105368108 A | 3/2016 |
| CN | 205661088 U | 10/2016 |
| CN | 106362215 A | 2/2017 |
| EP | 2561038 A1 | 2/2013 |
| JP | H06-172684 A | 6/1994 |
| JP | H11-080642 A | 3/1999 |
| JP | 3296445 B2 | 7/2002 |
| JP | 2008-533010 A | 8/2008 |
| JP | 2008-241237 A | 10/2008 |
| JP | 2014-058162 A | 4/2014 |
| JP | 2017-008251 A | 1/2017 |
| JP | 2017-165989 A | 9/2017 |
| KR | 10-2007-0103512 A | 10/2007 |
| KR | 10-2008-0110578 A | 12/2008 |
| KR | 10-2013-0092985 A | 8/2013 |
| KR | 10-2015-0015968 A | 2/2015 |
| KR | 10-2016-0100132 A | 8/2016 |
| WO | 99-49823 A1 | 10/1999 |
| WO | 2011/132137 A1 | 10/2011 |
| WO | 2014-025040 A1 | 2/2014 |
| WO | 2015-111500 A1 | 7/2015 |

OTHER PUBLICATIONS

International Search Report & Written Opinion issued for International Application No. PCT/KR2018/012574 dated Jan. 29, 2019, 13 pages.
Wang, Yingjun, "Biomedical ceramic materials," 1st edition, South China University of Technology Press, (2010), p. 338.
Extended European Search Report issued for European Patent Application No. 18869847.6 dated Jan. 8, 2020, 15 pages.
Kolewe et al., "Fewer Bacteria Adhere to Softer Hydrogels", ACS Applied Materials & Interfaces, vol. 7, No. 35, Aug. 26, 2015, pp. 19562-19569.
De Baróid et al., "Optimization of singlet oxygen production from photosensitizer-incorporated, medically relevant hydrogels", Journal of Biomedical Materials Research. Part B: Applied Biomaterials, vol. 105, No. 2, Oct. 27, 2015, pp. 320-326.
Ferreyra et al., "Synthesis and properties of 5,10,15,20-tetrakis[4-(3-N,N-dimethylaminopropoxy)phenyl] chlorin as potential broad-spectrum antimicrobial photosensitizers", Journal of Photochemistry and Photobiology B: Biology, Elsevier Science S.A., Basel, CH, vol. 158, Mar. 4, 2016, pp. 243-251.
Jiang et al., "A Perspective on the Trends and Challenges Facing Porphyrin-Based Anti-Microbial Materials", Small, vol. 12, No. 27, Jul. 1, 2016, pp. 3609-3644.

\* cited by examiner

ANTIMICROBIAL POLYMER COATING COMPOSITION AND ANTIMICROBIAL POLYMER FILM

CROSS-REFERENCE TO RELATED APPLICATION(S)

This application is a 35 U.S.C. § 371 National Phase Entry Application from PCT/KR2018/012574, filed on Oct. 23, 2018, and designating the United States, which claims the benefit of filing date of Korean Patent Application No. 10-2017-0137658 filed with Korean Intellectual Property Office on Oct. 23, 2017, the entire content are incorporated herein by reference.

TECHNICAL FIELD

The present invention relates to an antimicrobial polymer coating composition and an antimicrobial polymer film.

BACKGROUND ART

A photosensitizer absorbs light to produce reactive oxygen species (ROS), and photodynamic therapy (PDT), in which the photosensitizer is excited upon irradiation with light of a specific wavelength from the outside to generate active oxygen species or free radicals, thereby inducing apoptosis of various lesions or cancer cells and destroying them, is widely used.

Various attempts have been made to develop polymeric materials having antimicrobial activity using such photodynamic reaction, and for example, a method of melting a silicone resin or the like and then mixing the melted resin with a photosensitizer, and a method of using a coating solution formed by dissolving a silicone resin and a photosensitizer in a solvent, are known.

However, according to the method of melting a silicone resin or the like and mixing it with a photosensitizer, since dispersibility between the photosensitizer and the silicone resin is low, the photosensitizer in the silicone resin can be aggregated while not being homogeneously distributed.

In addition, when melted with the silicone resin, since it is impossible to adjust the thickness of the silicon after melting, it is limited in that it is not easy to produce products in accordance with application fields and uses, or it is not suitable for mass production.

Moreover, when a coating solution formed by dissolving a silicone resin and a photosensitizer in a solvent is used, it is known that a certain level of antimicrobial activity can be achieved without being severely limited in the field of application. However, it is not easy to produce active oxygen to such an extent that sufficient antimicrobial activity can be exhibited when light in the visible light region is used, and the produced active oxygen is present only for a very short period of time. Thus, there is a limitation in that an excessive amount of light energy must be irradiated for a relatively long period of time.

DETAILED DESCRIPTION OF THE INVENTION

Technical Problem

The present invention provides a photocurable antimicrobial coating composition which can maintain high antimicrobial activity for a long period of time even when using light in a visible light region, and can also control antimicrobial activities in an appropriate range according to the purpose of use thereof.

The present invention provides an antimicrobial coating film which maintains high antimicrobial activity for a long period of time even when using light in a visible light region, and also has the antimicrobial activity controlled to be in an appropriate range according to the purpose of use thereof.

Technical Solution

The present invention provides an antimicrobial polymer coating composition including a (meth)acrylate-based monomer or oligomer containing an alkylene oxide having 1 to 10 carbon atoms, a photosensitizer, and a photoinitiator.

The present invention also provides an antimicrobial polymer film including a cured product of the antimicrobial polymer coating composition.

In addition, the present invention provides an antimicrobial polymer film including a substrate layer including a polymer resin containing a (meth)acrylate-based repeating unit having an introduced alkylene oxide functional group having 1 to 10 carbon atoms, and a photosensitizer dispersed in the substrate layer, wherein the antimicrobial polymer film has surface energy of 32 mN/m or more.

Hereinafter, the antimicrobial polymer coating composition and the antimicrobial polymer film according to a specific embodiment of the present invention will be described in more detail.

In the present invention, the term "(meth)acrylate" refers to including both acrylate and methacrylate.

According to one embodiment of the invention, an antimicrobial polymer coating composition including a (meth)acrylate-based monomer or oligomer containing an alkylene oxide having 1 to 10 carbon atoms, a photosensitizer, and a photoinitiator can be provided.

The present inventors conducted research on materials having a functional property such as antimicrobial activity using a photosensitizer, and found through experiments that a photocurable coating composition produced by mixing a (meth)acrylate-based monomer or oligomer containing an alkylene oxide having 1 to 10 carbon atoms with a photosensitizer is not only easily applicable to various fields and is suitable for mass production, but can also realize high antimicrobial activity even when applying light in a visible light region during production of an actual coating film or a coated molded article, and particularly, generated active oxygen remains for a long time compared to previously known antimicrobial materials, and thus can achieve high antimicrobial efficiency. The present invention has been completed on the basis of such findings.

Specifically, in a polymer film or a polymer molded article produced using the coating composition, a predetermined polymer structure derived from the (meth)acrylate-based monomer or oligomer containing an alkylene oxide having 1 to 10 carbon atoms may be formed.

More specifically, a polymer resin containing a (meth)acrylate-based repeating unit containing an alkylene oxide having 1 to 10 carbon atoms may be contained in the polymer structure formed as described above.

Therefore, the polymer film and the polymer molded article are excellent in wettability to water ($H_2O$) based on the hydrophilicity of the alkylene oxide having 1 to 10 carbon atoms in the polymer structure formed above, and can retain atmospheric moisture therein even without another treatment.

In this connection, the polymer film or the polymer molded article can have high surface energy of 32 mN/m or more, for example 32 mN/m or more, and 50 mN/m or less.

As described above, when a polymer film or a polymer molded article having such high surface energy is irradiated with light in a visible light region, it may have specific air permeability, for example oxygen permeability, of 5 to 100 cc/m²·day, 20 to 90 cc/m²·day, or 25 to 80 cc/m²·day. Active oxygen may be more efficiently generated on the surface of the polymer film or the polymer molded article, and also it becomes easier for the generated active oxygen to diffuse into the polymer film or the polymer molded article. Further, the time during which the active oxygen diffused into the inside remains can be greatly increased.

Effective production of active oxygen on the surface of the polymer film or polymer molded article, easy diffusion to the inside thereof, and improvement of the lifetime of the diffused active oxygen are consequently factors for improving the antimicrobial properties of the polymer film or the molded polymer product.

On the other hand, in the molecular structure of the (meth)acrylate-based monomer or oligomer containing an alkylene oxide having 1 to 10 carbon atoms, the alkylene oxide having 1 to 10 carbon atoms may be located at the end of the (meth)acrylate-based monomer or oligomer or at the middle of the molecule thereof.

Further, the (meth)acrylate-based monomer or oligomer containing an alkylene oxide having 1 to 10 carbon atoms may be a mono(meth)acrylate-based monomer or oligomer containing an alkylene oxide having 1 to 10 carbon atoms, or a di(meth)acrylate-based monomer or oligomer including an alkylene oxide having 1 to 10 carbon atoms.

For example, the (meth)acrylate-based monomer or oligomer containing an alkylene oxide having 1 to 10 carbon atoms may be a di(meth)acrylate-based monomer or oligomer in which an alkylene oxide having 1 to 10 carbon atoms is contained in the middle of the molecule. In this case, it may be represented by the following Chemical Formula 1:

the (meth)acrylate monomer or oligomer containing an alkylene oxide having 1 to 10 carbon atoms, and may be 0.5 or more and less than 18.

As the molar ratio increases within the above range, the hydrophilic property of the (meth)acrylate-based monomer or oligomer containing an alkylene oxide having 1 to 10 carbon atoms is increased. Thus, the surface energy of the polymer film or the polymer molded article produced therefrom is increased, and the oxygen permeability is increased, thereby further increasing the antimicrobial property.

However, when the number of moles of the (meth)acrylate-based functional group is excessively small even if the number of moles of the alkylene oxide having 1 to 10 carbon atoms per mole of the (meth)acrylate monomer or oligomer is the same, it is necessary to irradiate visible light of a relatively high intensity in order to produce a polymer film or a polymer molded article.

However, photobleaching may occur in a polymer film or a polymer molded article produced by light irradiation of high intensity in this way.

In the polymer film or polymer molded article in which photobleaching has occurred, the amount of active oxygen species or free radicals produced is reduced. This problem may lead to a decrease in antimicrobial properties.

The upper limit of the molar ratio takes these problems into consideration.

On the other hand, in a case where it is less than the above range, when the number of moles of the (meth) acrylate-based functional group is excessively large even if the number of moles of the alkylene oxide having 1 to 10 carbon atoms per mole of the (meth)acrylate monomer or oligomer is the same, the film strength of the prepared polymer film or polymer molded article is increased, the oxygen permeability is greatly reduced, and the amount of active oxygen produced and its lifetime are reduced, resulting in a reduction in antimicrobial properties.

The lower limit value of the above molar ratio (note: [EO]/[Acyl]) takes these problems into consideration.

[Chemical Formula 1]

wherein, in Chemical Formula 1, $R_{11}$ and $R_{16}$ are, independently from each other, hydrogen or an alkyl having 1 to 3 carbon atoms, $R_{12}$ to $R_{15}$ are the same as or different from each other and are each independently an alkylene having 1 to 4 carbon atoms, n1 to n4 represent an addition mole number of the alkylene oxide repeating units and are the same as or different from each other and are each independently an integer of 0 to 13, and n1+n2+n3+n4 is 1 to 13, in which random or block phases can be formed by a mixed composition of one or more of the alkylene oxides.

The molar ratio of the alkylene oxide functional group to the (meth)acrylate-based functional group may be 0.5 or more and less than 18, per 1 mole of the (meth)acrylate-based monomer or oligomer containing an alkylene oxide having 1 to 10 carbon atoms.

That is, the molar ratio is a value obtained by dividing the number of moles of ethylene oxide by the number of moles of the acrylate-based functional group, based on 1 mole of Specifically, the (meth)acrylate-based monomer or oligomer containing an alkylene oxide having 1 to 10 carbon atoms has an appropriate one according to the intended characteristics within the range where a molar ratio of the alkylene oxide functional group relative to the (meth)acrylate-based functional group is 0.5 or more and less than 18, and more specifically, is 1 or more and less than 18, 1 or more and less than 17, 1 or more and less than 16, 1 or more and less than 15, or 1 or more and less than 13, and thereby, can control the degree of hydrophilization of the polymer film or the polymer molded product to be produced and ultimately control the antimicrobial activity.

The (meth)acrylate-based monomer or oligomer containing an alkylene oxide having 1 to 10 carbon atoms may have a predetermined molecular weight in consideration of the specific use and physical properties of the antimicrobial coating composition, and for example, it may have a weight average molecular weight of 500 g/mol to 10,000 g/mol.

As used herein, the weight average molecular weight means a weight average molecular weight in terms of polystyrene measured by the GPC method.

As described above, when the antimicrobial polymer coating composition is irradiated with light in a visible ray region after photocuring, the photosensitizer may be excited to generate active oxygen or the like. For this purpose, the antimicrobial polymer coating composition may contain a photosensitizer in a predetermined amount.

Specifically, the antimicrobial polymer coating composition may include 0.01 to 5 parts by weight of the photosensitizer relative to 100 parts by weight of the (meth)acrylate-based monomer or oligomer containing an alkylene oxide having 1 to 10 carbon atoms.

As the photosensitizer, a commonly known compound may be used. For example, porphine compounds, porphyrin compounds, chlorin compounds, bacteriochlorin compounds, phthalocyanine compounds, naphthalocyanine compounds, 5-aminolevuline esters, or combinations of two or more thereof may be used.

However, in order to achieve higher antimicrobial activity and antimicrobial activity-maintaining performance in the final product prepared from the antimicrobial polymer coating composition, it is preferable to use a porphine compound or a porphyrin compound. More preferably, as the photosensitizer, a porphine compound or a porphyrin compound in which 1 to 8 phenyl groups introduced with an alkoxy having 1 to 10 carbon atoms are introduced such as 5,10,15,20-tetrakis(4-methoxyphenyl)-porphine can be used.

The antimicrobial polymer coating composition may contain a photoinitiator in a predetermined amount.

Specifically, the antimicrobial polymer coating composition may include 0.001 to 10 parts by weight of the photoinitiator relative to 100 parts by weight of the (meth)acrylate-based monomer or oligomer containing an alkylene oxide having 1 to 10 carbon atoms.

Specific examples of the photoinitiator are not limited, and commonly known photoinitiators can be used without particular limitation.

Specific examples of the photoinitiator include benzophenone-based compounds, acetophenone-based compounds, non-imidazole-based compounds, triazine-based compounds, oxime-based compounds, or mixtures of two or more thereof.

The antimicrobial polymer coating composition may further include an organic solvent or a surfactant.

The organic solvent may be added at the time of mixing the respective components contained in the antimicrobial polymer coating composition, or may be contained in the antimicrobial polymer coating composition while the respective components are added in a state of being dispersed in or mixed with the organic solvent.

For example, the antimicrobial polymer coating composition may include an organic solvent such that the total solid content concentration of the components contained therein is 1 wt % to 80 wt %, or 2 to 50 wt %.

Non-limiting examples of the organic solvent include ketones, alcohols, acetates, and ethers, or mixtures of two or more thereof.

Specific examples of the organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran and propylene glycol monomethyl ether; or mixtures of two or more thereof.

The type of the surfactant is also not particularly limited, and an anionic surfactant, a cationic surfactant, an amphoteric surfactant, a nonionic surfactant, and the like can be used.

The antimicrobial polymer coating composition may contain 0.001 to 20 parts by weight of the surfactant relative to 100 parts by weight of the (meth)acrylate-based monomer or oligomer containing an alkylene oxide having 1 to 10 carbon atoms.

Meanwhile, the antimicrobial polymer coating composition may, optionally, further include a monomer or oligomer having a monofunctional or polyfunctional functional group, in addition to the urethane acrylate-based oligomer or polymer having a molar ratio of the urethane functional group relative to the (meth)acrylate-based functional group of 1 to 10.

Specifically, the antimicrobial polymer coating composition may include a monomer or an oligomer containing a (meth)acrylate or a vinyl group which is different from the (meth)acrylate-based monomer or oligomer containing an alkylene oxide having 1 to 10 carbon atoms.

Specifically, the photopolymerizable compound may include a monomer or an oligomer containing one or more, two or more, or three or more of (meth)acrylate or vinyl groups.

Specific examples of the monomer or oligomer containing the (meth)acrylate include pentaerythritol tri(meth)acrylate, pentaerythritol tetra(meth)acrylate, dipentaerythritol penta (meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri (meth)acrylate, trimethylolpropane trimethacrylate, ethylene glycol dimethacrylate, butanediol dimethacrylate, hexaethyl methacrylate, butyl methacrylate, or a mixture of two or more thereof, or alternatively an epoxide acrylate oligomer, an ether acrylate oligomer, a dendritic acrylate oligomer, or a mixture of two or more thereof.

In this case, the molecular weight of the oligomer is preferably 1000 to 10,000.

Specific examples of the vinyl group-containing monomer or oligomer include divinylbenzene, styrene, and paramethylstyrene.

Meanwhile, according to another embodiment of the present invention, an antimicrobial polymer film including a cured product of the antimicrobial polymer coating composition may be provided.

As described above, the antimicrobial polymer film prepared by curing the antimicrobial polymer coating composition is easily applicable to various fields and is suitable for mass production, but it can also realize high antimicrobial activity even when applying light in a visible light region, and particularly, the generated active oxygen remains for a long time compared to previously known antimicrobial materials, and thus can achieve high antimicrobial efficiency.

The antimicrobial polymer film can be obtained by coating the antimicrobial polymer coating composition onto a predetermined substrate and photo-curing the coated product.

The specific type and thickness of the substrate are not particularly limited, and substrates that are known to be used for the production of a conventional polymer film can be used without particular limitation.

A method and device commonly used for coating the antimicrobial polymer coating composition may be used without particular limitation, and for example, a bar coating method such as a Meyer bar method, a gravure coating method, a 2-roll reverse coating method, a vacuum slot die coating method, a 2 roll coating method, etc., may be used.

The coating thickness of the antimicrobial polymer coating composition may be determined according to the use of the antimicrobial polymer film to be finally produced. For example, the antimicrobial polymer coating composition may be coated (applied) in a thickness of 1 μm to 1000 μm.

In the step of photocuring the antimicrobial polymer coating composition, ultraviolet rays or visible rays having a wavelength of 200 to 400 nm can be irradiated, and an exposure amount during irradiation is preferably 50 to 2000 mJ/cm$^2$.

The exposure time is also not particularly limited, and can be appropriately changed depending on the exposure device used, the wavelength of the irradiation light, or the exposure amount.

Further, in the step of photocuring the antimicrobial polymer coating composition, nitrogen purging can be carried out to apply nitrogen atmosphere conditions.

Meanwhile, according to another embodiment of the present invention, an antimicrobial polymer film including a substrate layer including a polymer resin containing a (meth)acrylate-based repeating unit having an introduced alkylene oxide functional group having 1 to 10 carbon atoms, and a photosensitizer dispersed in the substrate layer, wherein the antimicrobial polymer film has a surface energy of 32 mN/m or more, can be provided.

As the substrate layer includes a (meth)acrylate-based repeating unit having an introduced alkylene oxide functional group having 1 to 10 carbon atoms, a predetermined polymer structure may be formed therein.

For example, the polymer resin containing a (meth)acrylate-based repeating unit having an introduced alkylene oxide functional group having 1 to 10 carbon atoms may be one in which an alkylene oxide functional group having 1 to 10 carbon atoms is introduced at the end of or at the middle of the (meth)acrylate-based repeating unit.

As the antimicrobial polymer film includes a (meth)acrylate-based repeating unit having an introduced alkylene oxide functional group having 1 to 10 carbon atoms, it may have high surface energy of 32 mN/m or more.

As the antimicrobial polymer film has a high surface energy of 32 mN/m or more, not only may active oxygen be more efficiently generated on the surface thereof, but also the amount of active oxygen diffused to the inside from the surface increases and the time during which the active oxygen remains therein can be greatly increased.

As a result, the antimicrobial polymer film may have specific air permeability, for example, oxygen permeability of 5 to 100 cc/m$^2$day, 20 to 90 cc/cc/m$^2$day, or 25 to 80 cc/cc/m$^2$day. Thus, active oxygen may be more efficiently generated on the surface thereof, and the time during which the active oxygen remains therein can be greatly increased.

A more detailed description thereof is as described above.

Figure 5:
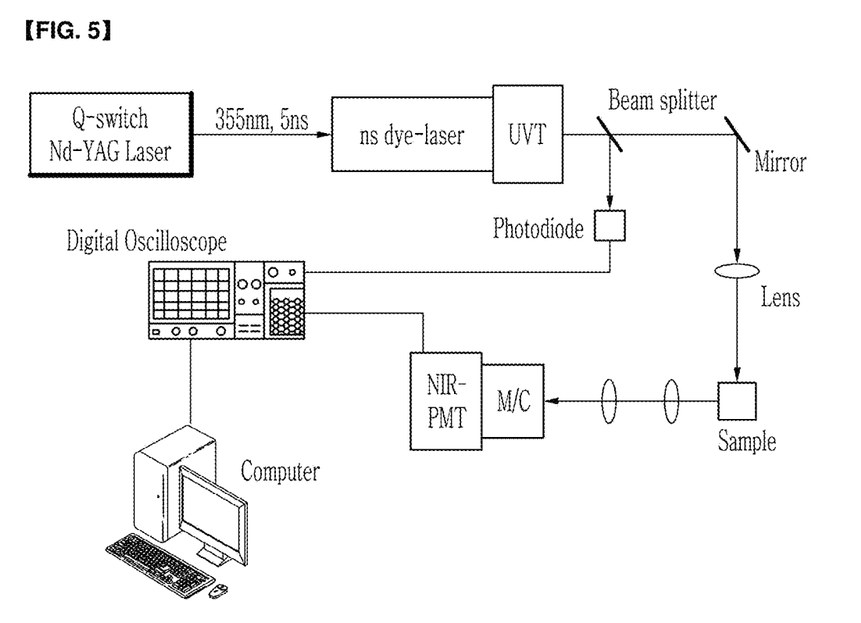
FIG. 5 schematically shows the method for measuring the production amount and lifetime of singlet oxygen in Experimental Example 3.

More specifically, the antimicrobial polymer film may have a singlet oxygen lifetime of 0.4 ms or more, 0.8 ms, or 0.10 ms to 0.80 ms, as measured through a time-resolved phosphorescence laser spectroscopy system (see FIG. 5).

Further, the antimicrobial polymer film may have antimicrobial activity of 90% or more, or 90% to 99.9999%, as measured by JIS R1702 (KS L ISO 27447; 2011, Fine ceramics—Test method for antimicrobial activity of semiconducting photocatalytic materials).

The antimicrobial polymer film may have a thickness of 10 μm to 10,000 μm.

Meanwhile, as the absolute value of the addition mole number of alkylene oxide functional groups in the polymer resin contained in the substrate layer increases, the surface energy of the antimicrobial polymer film is increased. However, if the relative molar ratio of alkylene oxide functional groups to (meth)acrylate-based functional groups is too high, the antimicrobial property can be rather lowered as described above.

Meanwhile, according to another embodiment of the present invention, an electronic product including the above-mentioned antimicrobial polymer film can be provided.

Examples of the electronic product are not particularly limited, and for example, it can be applied to products where harmful bacteria (fungi, etc.) are easily grown, such as a humidifier, a water tank, a refrigerator, an air washer, an aquarium, and an air cleaner.

In order to produce active oxygen or radicals in the antimicrobial polymer film, the electronic product may include a light irradiation device.

In addition, the electronic product may further include a device for distributing the produced active oxygen or radical, for example, an air circulation device.

Advantageous Effects

According to the present invention, a photocurable antimicrobial coating composition which can maintain high antimicrobial activity for a long period of time even when using light in a visible light region, and can provide an antimicrobial material suitable for a mass production process, and an antimicrobial coating film which can maintain high antimicrobial activity for a long period of time even by using light in a visible light region, can be provided.

DETAILED DESCRIPTION OF THE EMBODIMENTS

Embodiments of the present invention are described in more detail by way of the examples provided below.

However, the following examples are given for illustrative purposes only, and the scope of the present invention is not intended to be limited to or by these examples.

PREPARATION EXAMPLE

Preparation of (meth)acrylate-Based Oligomer Containing an Alkylene Oxide Having 1 to 10 Carbon Atoms Preparation Example 1

A (meth)acrylate-based oligomer containing an alkylene oxide having 1 to 10 carbon atoms was prepared according to the following Reaction Scheme 1.

Specifically, 5 g of triethylene glycol was dispersed in a mixed solution of 5 g of potassium carbonate ($K_2CO_3$) and 50 g of dimethyl sulfoxide, and then mixed for 30 minutes (0° C., $N_2$-purged conditions).

Then, 10 g of 2-chloroethyl acrylate (M. W. of 134.56 g/mol) was added thereto and reacted for 3 hours.

Figure 1:
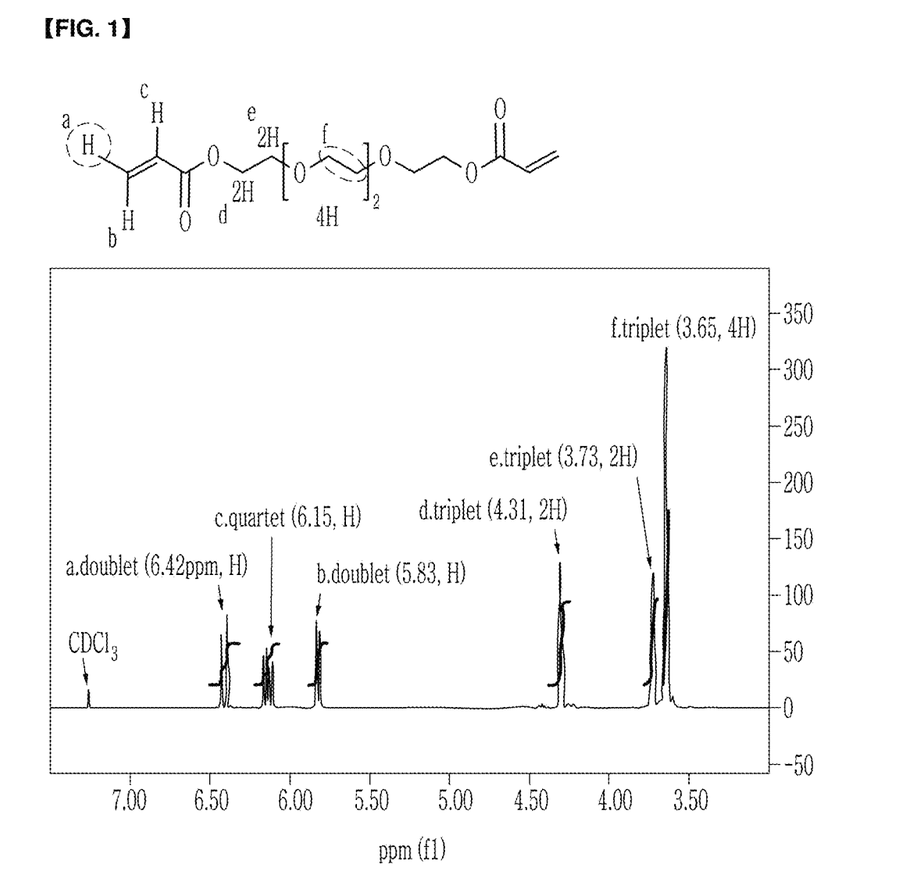
FIG. 1 shows the result of NMR analysis of the product of Preparation Example 1.

The reaction product was obtained through a column, and from the results of NMR analysis (FIG. 1) and GC-MS analysis (weight average molecular weight: 302.32 g/mol), it was confirmed whether an alkylene oxide (meth)acrylate of the following Reaction Scheme 1 was produced.

[Reaction Scheme 1]

Preparation Example 2

A (meth)acrylate-based oligomer containing an alkylene oxide having 1 to 10 carbon atoms was prepared according to the following Reaction Scheme 2.

Specifically, the reaction was carried out in the same manner as in Preparation Example 1, except that 7 g of PEG200 (polyethylene glycol 200) was used instead of 5 g of triethylene glycol in Preparation Example 1.

Figure 2:
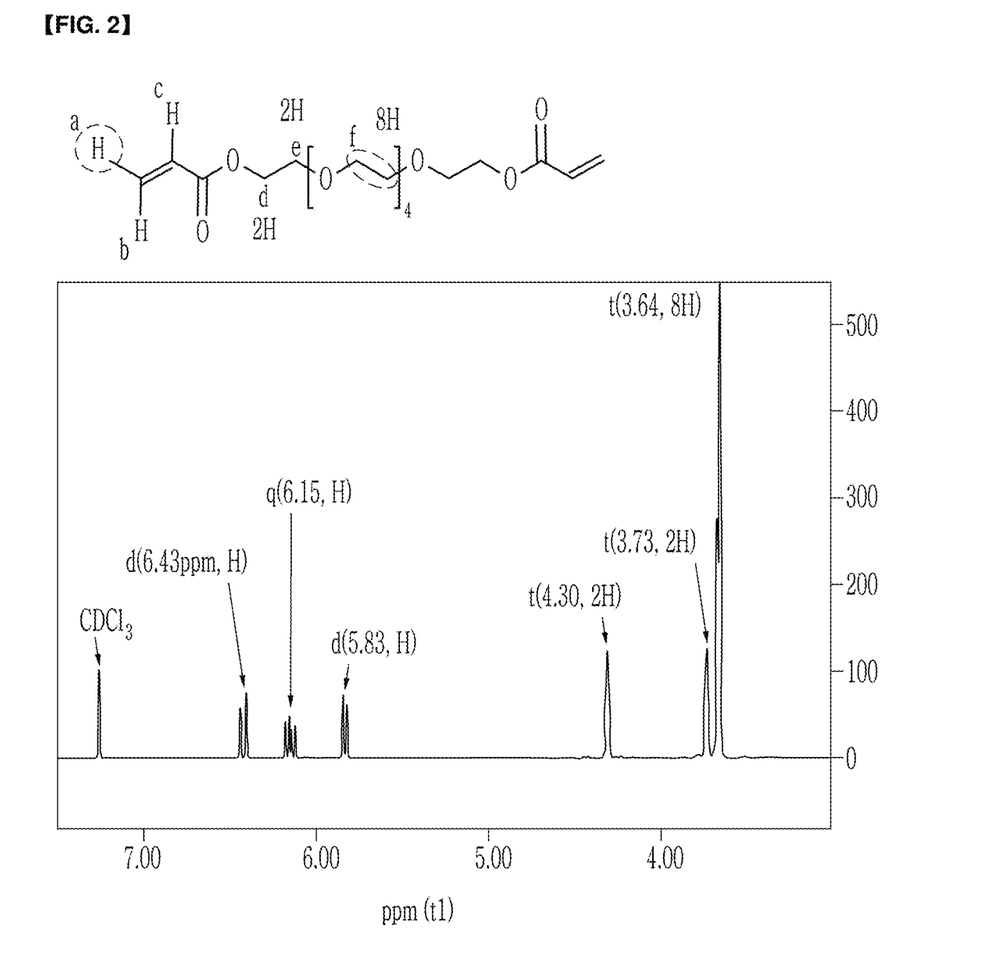
FIG. 2 shows the result of NMR analysis of the product of Preparation Example 2.

The reaction product was obtained through a column, and from the results of NMR analysis (FIG. 2) and GC-MS analysis (weight average molecular weight: 390.43 g/mol), it was confirmed whether an alkylene oxide (meth)acrylate of the following Reaction Scheme 2 was produced.

[Reaction Scheme 2]

Preparation Example 3

A (meth)acrylate-based oligomer containing an alkylene oxide having 1 to 10 carbon atoms was prepared according to the following Reaction Scheme 3.

Specifically, the reaction was carried out in the same manner as in Preparation Example 1, except that 14 g of PEG400 (polyethylene glycol 400) was used instead of 5 g of triethylene glycol in Preparation Example 1.

Figure 3:
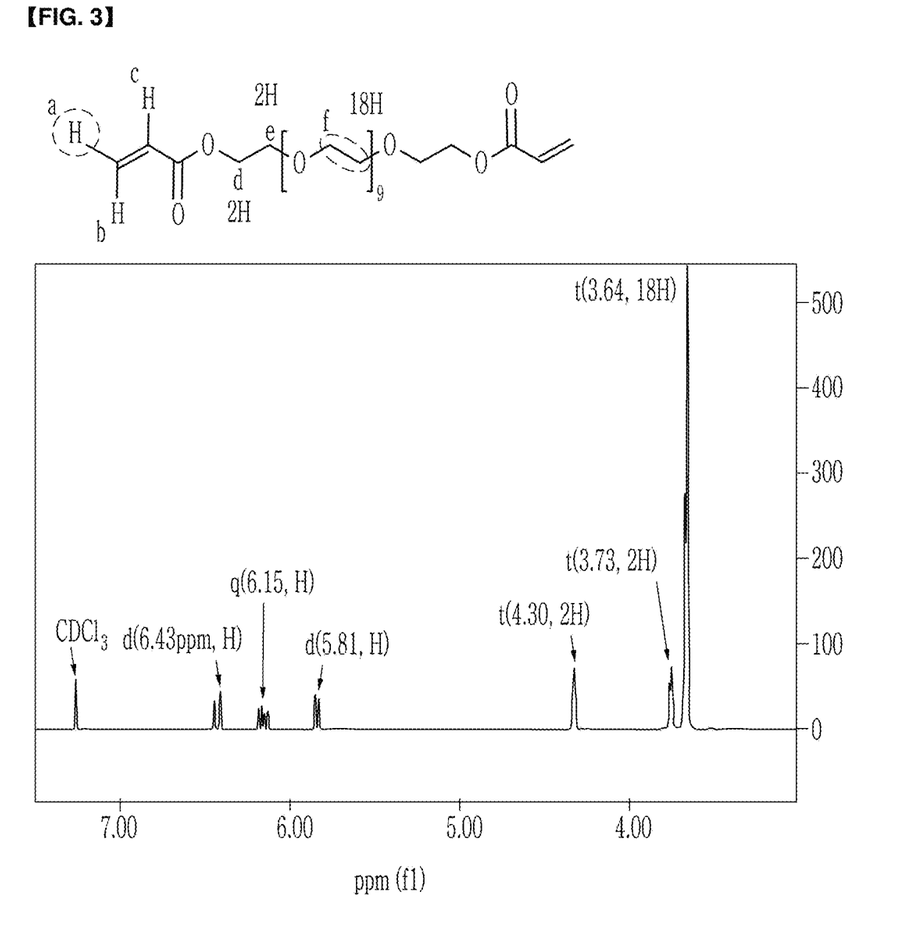
FIG. 3 shows the result of NMR analysis of the product of Preparation Example 3.

The reaction product was obtained through a column, and from the results of NMR analysis (FIG. 3) and GC-MS analysis (weight average molecular weight: 610.69 g/mol), it was confirmed whether an alkylene oxide (meth)acrylate of the following Reaction Scheme 3 was produced.

[Reaction Scheme 3]

Preparation Example 4

A (meth)acrylate-based oligomer containing an alkylene oxide having 1 to 10 carbon atoms was prepared according to the following Reaction Scheme 4.

Specifically, the reaction was carried out in the same manner as in Preparation Example 1, except that 20 g of PEG600 (polyethylene glycol 600) was used instead of 5 g of triethylene glycol in Preparation Example 1.

Figure 4:
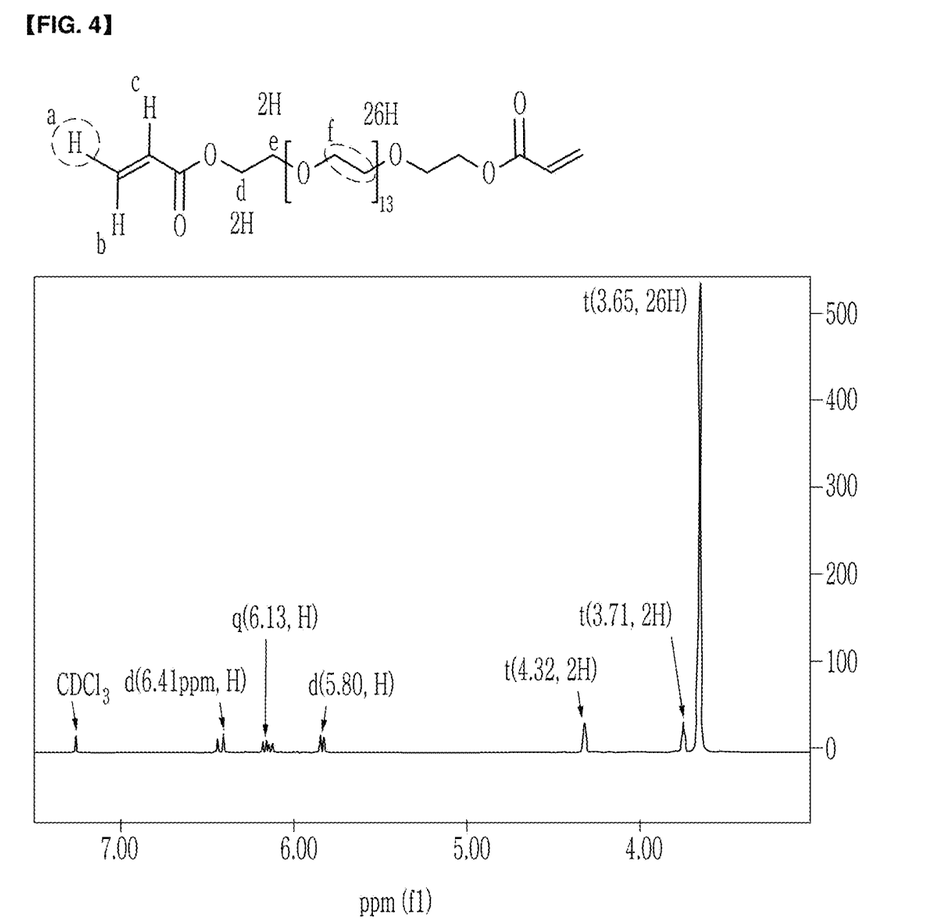
FIG. 4 shows the result of NMR analysis of the product of Preparation Example 4.

The reaction product was obtained through a column, and from the results of NMR analysis (FIG. 4) and GC-MS analysis (weight average molecular weight: 786.91 g/mol), it was confirmed whether an alkylene oxide (meth)acrylate of the following Reaction Scheme 4 was produced.

[Reaction Scheme 4]

EXAMPLE

Preparation of Antimicrobial Polymer Coating Composition and Antimicrobial Polymer Film Example 1

Ethylene glycol dimethacrylate (EGDMA, Miramer M221, CAS No. 97-90-5), which is one type of alkylene oxide (meth)acrylate-based oligomer and has the following structure, was prepared.

100 g of the ethylene glycol dimethacrylate, 5 g of trimethylolpropane triacrylate (TMPTA), 1 g of photosensitizer 5,10,15,20-tetrakis(4-methoxyphenyl)-porphine (CAS No. 22112-78-3), 2 parts by weight of a photoinitiator (trade name: Darocure TPO), 0.1 g of a surfactant (trade name: RS90 DIC), 50 g of toluene, and 50 g of ethanol were mixed to prepare an antimicrobial polymer coating solution (solid content concentration of 50%).

Then, the antimicrobial polymer coating solution was coated using a #10 bar, and then cured at a rate of 2 m/min using a UV lamp of 0.2 $J/cm^2$ to prepare an antimicrobial polymer film having a thickness of 10 μm.

Examples 2 to 5

The respective antimicrobial polymer coating solutions (solid content concentration of 50%) and the respective antimicrobial polymer films (thickness of 10 μm) were prepared in the same manner as in Example 1, except that the respective alkylene oxide(meth)acrylate-based oligomers of Preparation Examples 1 to 4 were used instead of ethylene glycol dimethacrylate of Example 1.

COMPARATIVE EXAMPLES

Comparative Example 1

An antimicrobial polymer coating solution (solid content concentration of 50%) and an antimicrobial polymer film (thickness of 10 μm) were prepared in the same manner as in Example 1, except that methyl methacrylate (MMA) was used instead of ethylene glycol dimethacrylate of Example 1.

Comparative Example 2

An antimicrobial polymer coating solution (solid content concentration of 50%) and an antimicrobial polymer film (thickness of 10 μm) were prepared in the same manner as in Example 1, except that methoxy PEG600 methacrylate (Miramer M193, MPEG600MA) was used instead of ethylene glycol dimethacrylate of Example 1, and a UV lamp of 0.1 J/cm² was used instead of a UV lamp of 0.2 J/cm² during coating.

Comparative Example 3

An antimicrobial polymer coating solution (solid content concentration of 50%) and an antimicrobial polymer film (thickness of 10 μm) were prepared in the same manner as in Example 1, except that trimethylol propane (EO)$_9$ triacrylate (TMP(EO)$_9$TA, Miramer M3190) having the following structure was used instead of ethylene glycol dimethacrylate of Example 1.

EXPERIMENTAL EXAMPLE

Experimental Example 1: Water Contact Angle and Surface Energy of Polymer Films The water contact angle and surface energy of each polymer film of the examples and comparative examples were measured according to ASTM D7490-13 [Standard Test Method for Measurement of the Surface Tension of Solid Coatings, Substrates and Pigments using Contact Angle Measurements], and the results are shown in Table 1 below.

Experimental Example 2: Measurement of Oxygen Permeability of Polymer Films The oxygen permeability of each polymer films of the examples and comparative examples was measured at 25° C. under a 60 RH % atmosphere using an Oxygen Permeation Analyzer (Model 8000, Illinois Instruments product) according to ASTM D 3595.

Experimental Example 3: Measurement of the Production Amount and Lifetime of Singlet Oxygen of the Polymer Films of Examples and Comparative Examples The production amount and lifetime of singlet oxygen of each polymer film of the examples and comparative examples were measured using a time-resolved phosphorescent laser spectroscopy system shown schematically in FIG. 5.

Specifically, $^1O_2$ (singlet oxygen) exhibits photoluminescence at 1275 nm. Accordingly, the presence/absence of production of $^1O_2$ and the relative amount were measured by using a near infrared photomultiplier tube (NIR-PMT) in a wavelength range of 900 nm to 1400 nm, and the movement of $^1O_2$ was observed through a time-resolved spectrum.

In the case of NIR-PMT, a photoluminescence value in the wavelength region of 900 to 1400 nm could be obtained. Since singlet oxygen exhibited light emission at 1275 nm, in order to optionally detect light emission at 1275 nm, only the light emission (PL) value detected at 1275 nm was obtained by mounting an M/C (monochromator) in front of PMT.

Figure 6:
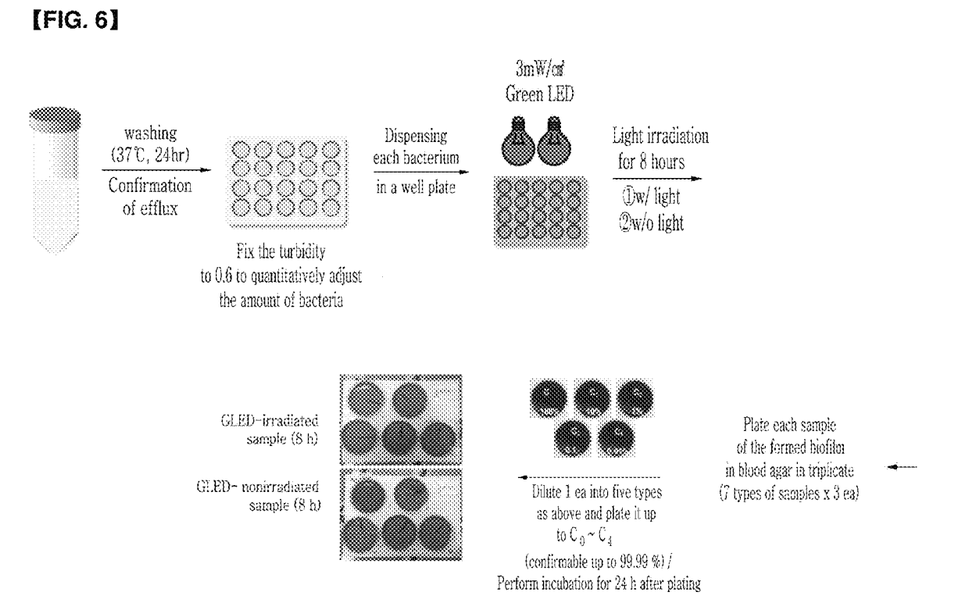
FIG. 6 schematically shows a method for measuring the antimicrobial activity of the polymer films of examples and comparative examples according to JIS R 1702 (KS ISO 27447) in Experimental Example 4.

Experimental Example 4: Measurement of Antimicrobial Activity of Polymer Films of Examples and Comparative Examples The antimicrobial activities of the polymer films of the examples and comparative examples were measured by the method shown schematically in FIG. 6 according to JIS R 1702.

TABLE 1

|  | [EO]/[Acryl] Molar ratio | Oxygen permeability (cc/m² · day) | Singlet oxygen (¹O₂) Production amount (relative value) | Singlet oxygen (¹O₂) Lifetime (us) | Contract angle (@ water, °) | Surface energy (mN/m) | Antimicrobial activity |
|---|---|---|---|---|---|---|---|
| Comparative Example 1 | — | <5 | 1 (reference) | 20 | 94.2 | 25.8 | <90% |
| Example 1 | 1 | 32 | 1.5 | 330~350 | 79.2 | 32.7 | 91.4% |
| Example 2 | 2 | 30 | 1.6 | 330~350 | 77.5 | 34.5 | 94.8% |
| Example 3 | 4 | 25 | 1.6 | 350~370 | 75.0 | 36.1 | 96.5% |
| Example 4 | 9 | 22 | 1.7 | 350~370 | 60.8 | 43.2 | >99.9% |
| Example 5 | 13 | 20 | 1.6 | 350~370 | 58.5 | 45.6 | >99.9% |
| Comparative Example 2 | 26 | <5 | 0.4 | 35 | 80.5 | 31.5 | <90% |
| Comparative Example 3 | 18 | <5 | 0.8 | 80~85 | 83.1 | 29.8 | <90% |

*Note:
the molar ratio of [EO]/[Acryl] means a value obtained by dividing the number of moles of ethylene oxide by the number of moles of the acryl functional group, based on 1 mole of the monomer (oligomer) used as a raw material in each of Comparative Examples 1 to 3 and Examples 1 to 5.

According to Table 1 above, it can be confirmed that in the case where a polymer film was produced using a (meth)acrylate-based oligomer containing an alkylene oxide having 1 to 10 carbon atoms (Examples 1 to 5), the polymer film shows a low contact angle as compared with the case of using a (meth)acrylate-based oligomer not containing any alkylene oxide having 1 to 10 carbon atoms (Comparative Example 1), the surface energy satisfies a high range of 32 mN/m or more (specifically, for example, 32 mN/m to 50 mN/m), and the antimicrobial activity is as high as 90% or more.

This difference is due to the inclusion or non-inclusion of an alkylene oxide having 1 to 10 carbon atoms. In the case of including an alkylene oxide having 1 to 10 carbon atoms, it can be seen that the difference is due to the improvement in the hydrophilicity of the polymer film.

Further, it can be seen that Examples 1 to 5 commonly use a (meth)acrylate-based oligomer containing an alkylene oxide having 1 to 10 carbon atoms as a raw material of the composition, and the surface energy of the prepared polymer film differs depending on the molar ratio of the alkylene oxide functional group to the (meth)acrylate-based functional group.

In particular, it can be confirmed that the polymer films in which the molar ratio of the alkylene oxide functional group to the (meth)acrylate-based functional group (note: [EO]/[Acyl]) is 8 or more and 15 or less, and the surface energy is 40 mN/m or more (Examples 4 and 5), exhibit antimicrobial activity of 99.9% or more.

On the other hand, when the molar ratio ([EO]/[Acyl]) of the alkylene oxide functional group to the (meth)acrylate-based functional group is 18 or more (Comparative Examples 2 and 3), the relative mole number of the (meth)acrylate-based functional group relative to the alkylene oxide functional group is small, and thus the film was not formed under the conditions of visible light of the same intensity as that of the examples, and as a result of irradiating visible light of a relatively high intensity, it could be formed into a polymer film for the first time.

It can be confirmed that with such high intensity visible light, the film of Comparative Example 2 causes photobleaching, and the production amount of singlet oxygen is rather decreased and the antimicrobial property is decreased as compared with the examples.

The invention claimed is:

1. A composition for an antimicrobial polymer coating, comprising a (meth)acrylate-based monomer or oligomer represented by Chemical Formula 1, containing an alkylene oxide functional group and a (meth)acrylate-based functional group; a photosensitizer; and a photoinitiator,
wherein the photosensitizer includes one or more selected from the group of a porphine compound, a porphyrin compound, a chlorin compound, a bacteriochlorin compound, a phthalocyanine compound, a naphthalocyanine compound, and a 5-aminolevuline ester, and
wherein a molar ratio of the alkylene oxide functional group to the (meth)acrylate-based functional group is 0.5 or more and less than 18, per 1 mol of the (meth)acrylate-based monomer or oligomer:

[Chemical Formula 1]

wherein, in the Chemical Formula 1,
$R_{11}$ and $R_{16}$ are each independently hydrogen or an alkyl having 1 to 3 carbon atoms;
$R_{12}$ to $R_{15}$ are the same as or different from each other, and are each independently an alkylene having 1 to 4 carbon atoms; and
n1 to n4 are the same as or different from each other, are each independently an integer of 0 to 13, and n1+n2+n3+n4 is 1 to 13, in which random or block phases are formed by a mixed composition of one or more of the alkylene oxide functional groups.

2. The composition of claim 1, wherein
the (meth)acrylate-based monomer or oligomer has a weight average molecular weight of 500 g/mol to 10,000 g/mol.

3. The composition of claim 1, wherein
the photosensitizer is present 0.01 to 5 parts by weight based 100 parts by weight of the (meth)acrylate-based monomer or oligomer.

4. The antimicrobial polymer coating composition of claim 1, wherein
the photosensitizer includes a porphine compound or a porphyrin compound, to which 1 to 8 of phenyl groups comprising an alkoxy group having 1 to 10 carbon atoms are introduced.

5. The composition of claim 1,
further comprising an organic solvent or a surfactant.

6. The composition of claim 1,
further comprising a monomer or an oligomer containing a (meth)acrylate which is different from the (meth)acrylate-based monomer or oligomer, or a monomer or an oligomer containing a vinyl group.

7. An antimicrobial polymer film comprising a cured product of the composition of claim 1.

8. The antimicrobial polymer film of claim 7,
wherein the antimicrobial polymer film has a surface energy of 32 mN/m or more.

9. The antimicrobial polymer film of claim 7, wherein
the antimicrobial polymer film has an oxygen permeability of 5 to 100 $cc/m^2$ per day.

10. The antimicrobial polymer film of claim 7, wherein
the antimicrobial polymer film has a thickness of 10 μm to 10,000 μm.

11. The antimicrobial polymer film of claim 7, wherein
a lifetime of singlet oxygen measured using a time-resolved phosphorescent laser spectroscopy system is 350 μs or more.

12. The antimicrobial polymer film of claim 7, wherein
antimicrobial activity measured according to JIS R 1702 (KS L ISO 27447; 2011) is 90% or more.

13. An electronic product comprising the antimicrobial polymer of claim 7.

14. The electronic product of claim 13, wherein
the electronic product is a humidifier, a refrigerator, an air washer, or an aquarium.

* * * * *